March 3, 1936.   R. L. LEE   2,033,038
PROJECTOR
Filed June 13, 1932   2 Sheets-Sheet 1
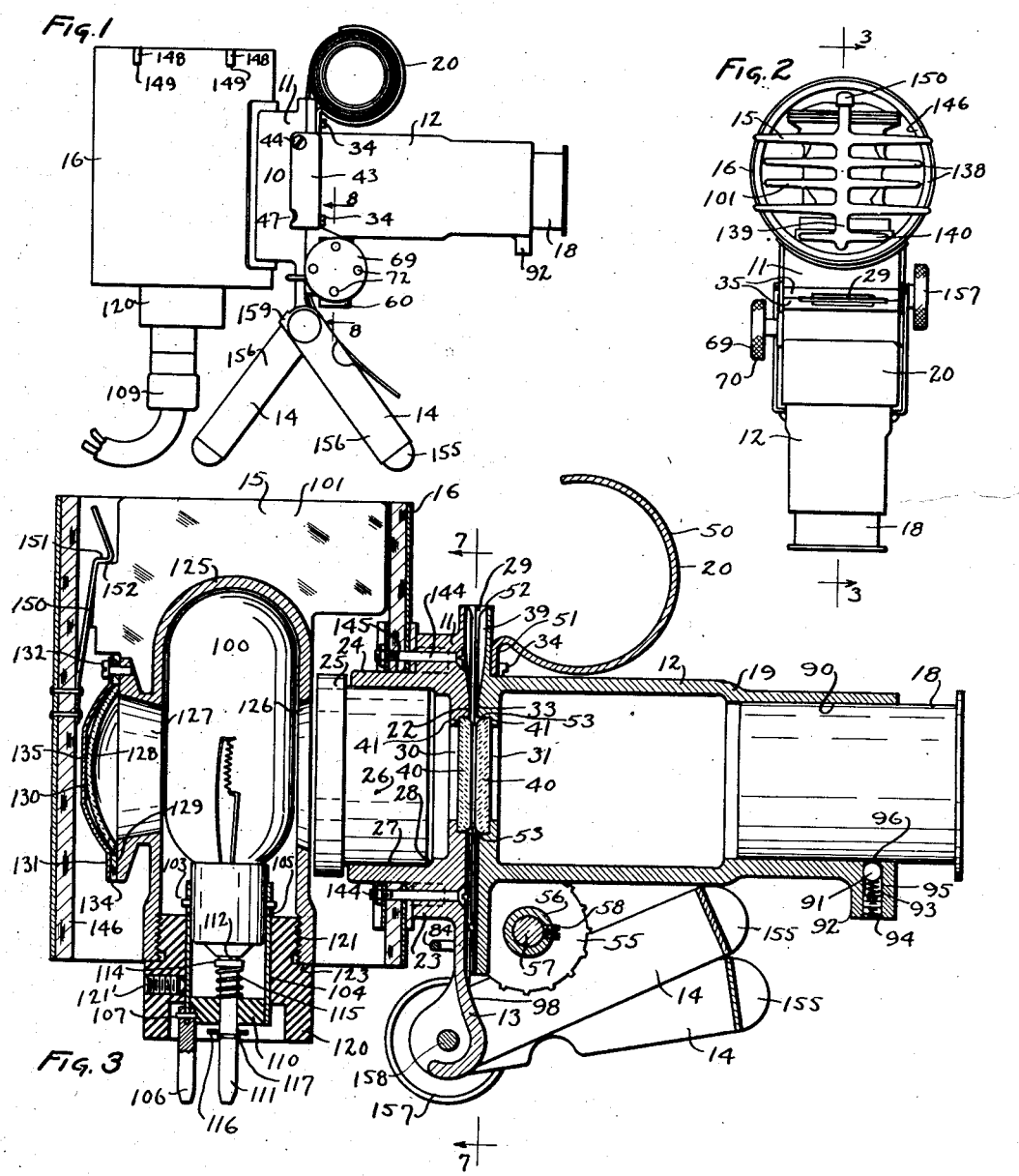
Inventor
Ralph L. Lee
By Maréchal & Noe
Attorney March 3, 1936.  R. L. LEE  2,033,038
PROJECTOR
Filed June 13, 1932  2 Sheets-Sheet 2
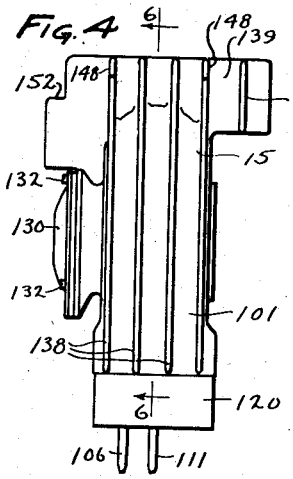
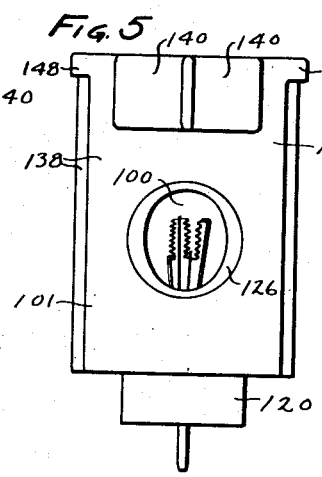
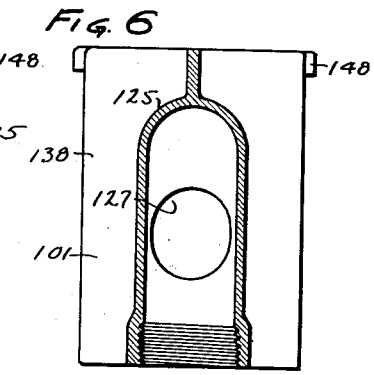
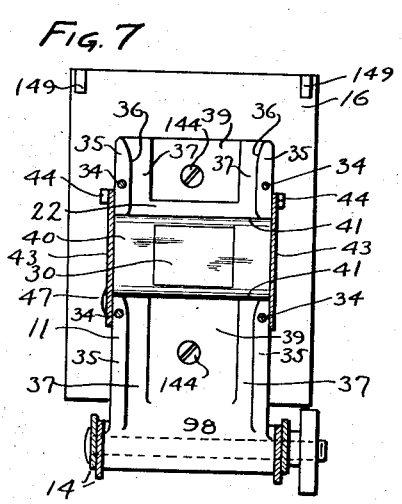
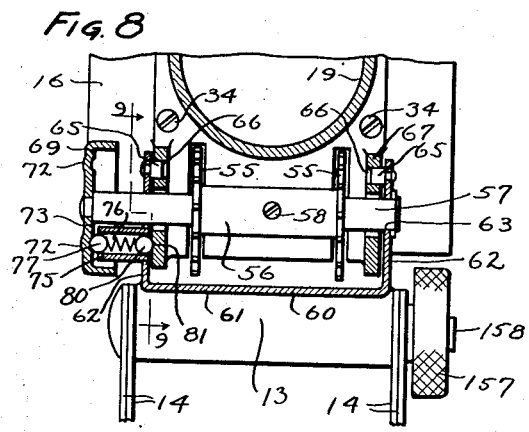
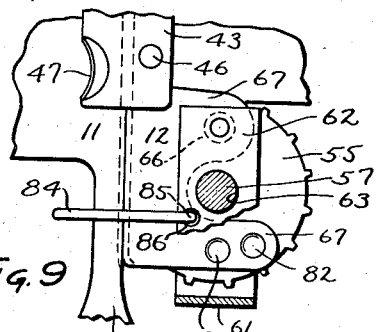
Inventor
Ralph L. Lee
By Maréchal & Noe
Attorney Patented Mar. 3, 1936

2,033,038

UNITED STATES PATENT OFFICE 2,033,038

PROJECTOR

Ralph L. Lee, Dayton, Ohio, assignor, by mesne assignments, to Motion Picture Engineering Company, a corporation of Michigan Application June 13, 1932, Serial No. 616,925

11 Claims. (Cl. 88—24)

This invention relates to picture projectors.

One of the principal objects of the invention is the provision of a compact, readily portable projector of simple construction embodying an assembly of parts securely held in proper operating alignment and readily accessible for inspection or replacement.

Another object of the invention is the provision, in a projector, of a picture illuminating lamp and a contiguous heat radiator arranged for effective dissipation of the heat generated within the lamp.

Another object of the invention is the provision of a projector having a body portion in which are crossed slots providing a closed film chute and a mount for loosely receiving aperture glasses.

Other objects and advantages of the invention will be apparent from the following description, the accompanying drawings and the appended claims.

In the drawings, which illustrate a preferred embodiment of the invention,—

Fig. 1 is a side elevational view of a projector constructed in accordance with this invention;

Fig. 2 is a top plan view of the projector;

Fig. 3 is a longitudinal sectional view taken on the line 3—3 of Fig. 2;

Fig. 4 is a side elevational view of the light source unit;

Fig. 5 is a front elevational view of the light source unit;

Fig. 6 is a sectional view taken on the line 6—6 of Fig. 4;

Fig. 7 is a vertical sectional view taken on the line 7—7 of Fig. 3;

Fig. 8 is a sectional view taken on the line 8—8 of Fig. 1; and

Fig. 9 is a sectional view taken on the line 9—9 of Fig. 8.

The drawings, in which like characters of reference designate like parts throughout the several views thereof, illustrate a projector which comprises generally a film guiding body 10 embodying the two connected body portions 11 and 12 which are shown formed as metal castings. Body portion 11 has an integrally extending lug 13 for the attachment of supporting legs 14. A light source, designated generally by the numeral 15, is mounted within a shell 16 that is permanently attached to the body 10. The focusing lens 18 is slidably mounted in the supporting body portion 12 which is securely joined to the body portion 11. A film carrier 20 is also attached to the body 10, the various parts mentioned forming a rigid and compact assembly.

The body portion 11 is formed with a flat end 22 from which a substantially rectangular sleeve-like portion 23 projects for attachment of the shell 16. A tubular portion 24 projects from the sleeve portion 23 through a hole in the shell 16 and forms a support in which the condensing lens 25 is received. The condensing lens is constructed with a cylindrical metal exterior wall 26 which is slidably received within the cylindrical bore 27 of the body extension 24. Entrance of the lens 25 within the part 24 is limited by a shoulder 28. Its unintentional removal from assembled position is prevented by its close proximity to the lamp source.

The generally tubular lens supporting member 12 has a flat end 33 that is generally similar in form to the flat end 22 of the body portion 11. These flat parts are securely joined together by screws 34 and their abutting faces are slotted so as to provide a chute or guide 29 for the passage of a film through a light beam projected from the light source 15 through the portions 11 and 12. The flat end 22 of the body portion 11 is provided with a rectangular light aperture 30 for the passage of the light beam from the light source through the film which is held within the guide or chute between the body portion 11 and the lens supporting portion 12 which is provided with a similarly shaped and aligned light aperture 31. As shown particularly in Fig. 7, the abutting ends 22 and 33 comprise somewhat narrow portions 35 at the sides of the portions 11 and 12. The remainder of the adjacent faces of these portions are cut away to a width to accommodate a film as indicated by the slot edges 36 and provide clearance for the film which is guided along the surfaces 37. The cut away parts defining the film chute 29 are of stepped depth; those portions defined by the faces 37 extending only from the side walls 36 of the slot inwardly an amount sufficient to form a rather close fitting guide for the edge portions of the film, while the remainder of the film is given additional clearance by provision of shallow grooves 39.

That part of the film which is exposed to the light beam between the light apertures 30 and 31 passes between aperture glasses 40 that are loosely held within recesses formed in the abutting faces of the portions 11 and 12. As shown, these aperture glasses are mounted within slots 41 that are formed across the faces of the flat parts of the body portion 11 and lens carrying portion 12 perpendicularly to the film chute 29. The slots 41 are of sufficient depth to permit the film to pass between the adjacent faces of the aperture glasses with sufficient clearance that the film will not be scratched and yet will be held closely enough to prevent curling upon exposure to the heat of the light source. A clearance of a few thousandths of an inch has been found to be quite satisfactory for proper passage of the film, and to hold the film sufficiently flat to provide an undistorted image. The glass slots 41 extend clear across the width of the parts 10 and 19 and the aperture glasses are preferably substantially of the same length as the slot. The slot ends are closed by metal cover plates 43 which are pivotally attached to the body portion 11 by screws 44. The plates 43 are frictionally held in position by the tension of the screws 44 and by provision of a punched projection 46 which engages an aligned depression in the side of the body part against which each plate lies. When it is desired to remove the aperture glasses it is only necessary to swing a plate 43 around its mounting screw 44 as an axis, and this is readily accomplished through the provision of a finger operated projection 47 by which the plate may be moved. The proportioning of the plate size and the positioning of the attaching screw 44 is such that upon swinging a plate through 90° from the closed position the glass slots 41 are fully uncovered for removal of the aperture glasses therefrom.

The travel of the film through the projector is from the carrier 20 down through the chute 29 and out the bottom of the chute. Film advancing means are provided for moving the film past the light aperture in steps coordinated with the film framing. To thread the film through the projector it is inserted within the film carrier 20 which is constructed of sheet metal that is formed into a semi-cylindrical portion 50 having at one end a downturned lug 51 with screw holes for attachment to the projector by means of the same screws 34 that serve to hold the body portion 11 and the lens carrying portion 12 permanently assembled. The film end is then pushed down through the film chute and into engagement with the film advancing means. To facilitate the passage of the film the top edge of the film chute is tapered or rounded off as indicated at 52, and the aperture glasses 40 are also formed with curved edges 53 so that the film may be readily pushed between them.

The film is fed through the machine by an advancing mechanism that operates by a turning movement and is constructed to frictionally resist film movement at spaced points corresponding to the film framing. As shown, the advancing mechanism comprises sprockets 55 which are fixedly mounted at opposite ends of a sleeve 56 and are spaced apart thereon a distance corresponding to the lateral spacing of the advancing holes on the film. The sprocket sleeve is held to an operating shaft 57 by provision of a set screw 58. This operating shaft 57 is rotatably carried in a bracket 60 that is supported from the projector body portion 12. As shown, the bracket 60 is constructed of sheet metal and is formed into U-shape comprising a flat portion 61 and upstanding arms 62 having bearing openings 63 for support of the shaft 57. The ends of the bracket arms 62 have fixed to them inwardly extending pins 65 that are received within axially aligned holes 66 in projecting lugs 67 formed on the flat part of the lens carrying portion 12. The pins 65 are a loose fit within the openings 66 so that the bracket 60 may swing about the pins 65 as a center. The end of the shaft 57 has fixed to it a hand wheel 69 which is provided with a knurled face 70 by which the operator may advance the film feeding sprockets 55. The film perforations bear a definite relationship to the film framing and the sprocket size is proportioned to spacing of film holes so that the sprocket movement necessary to advance the film by one frame is an aliquot fraction of one revolution of the hand wheel 69. In the illustrated embodiment of the invention, 90° rotation of the hand wheel will advance the film by one frame.

Retarding means are provided so as to releasably hold the sprockets in positions wherein the film frame is aligned with the light apertures 30 and 31. As shown, this retarding means is of a frictional character, and comprises a detent mechanism which engages depressed portions 72 formed in the web part 73 of the hand wheel. These depressions are spaced apart 90° as is shown in Fig. 1. The detent mechanism is supported from the sprocket carrying bracket 60 and comprises a sleeve 75 fixed to the bracket arm 62 and enclosing a spring 76 that bears against a ball 77 and presses this ball into engagement with the inner face of the wheel web portion 73 to enter the depressions 72. Upon rotating the hand wheel 69 its movement is frictionally resisted each 90° upon the ball 77 entering a depression 72. This same detent mechanism serves to frictionally hold the bracket 60 in a position wherein the film sprocket is held in engaging relationship with the film feeding holes and a position wherein the sprockets are removed from engaging position. The detent control for the bracket 60 comprises a ball 80 that is pressed by the spring 76 against the lug 67 to engage in one or the other of spaced depressions 81 and 82. Engagement of the ball within the depression 81 positions the bracket for engagement of the sprockets 55 with the film and frictionally resists movement of the sprocket carrying bracket from this position. Movement of the bracket to the release position is limited by provision of a wire bail 84 which encircles the depending lug 11 and has inturned end portions 85 that are received within aligned openings 86 in the upturned parts 62 of the bracket. The length of the bail is proportioned to prevent movement of the bracket 60 beyond engagement of the detent ball 80 with the depression 82.

Having entered a film in the film chute it is pushed downwardly until the film end engages the sprocket teeth. If the film end has been trimmed in proper relationship to the film framing, the engagement of the film end with the sprocket tooth should frame the film properly with respect to the light apertures so that upon then turning the hand wheel 90° the film will be advanced by an amount to bring the next frame into registration with the opening. If, however, the film end is not properly trimmed with respect to the framing it is only necessary to swing the bracket 60 outwardly to permit free adjusting movement of the film within the chute until a frame is in proper registration whereupon the bracket 60 is moved back so that the detent engages the depression 81 and the sprocket teeth will then engage the film feeding holes. As mentioned, the film feeding holes are proportioned to the film framing so that a 90° movement of the hand wheel will provide for film advance of one frame.

The focusing lens 18 is a sliding fit within the cylindrical bore 90 of the projector portion 12 and is frictionally held in adjusted position by provision of a spring pressed ball 91 that is mounted within a lug 92 on the part 19. As shown, the ball 91 is urged into engagement with the lens 18 by a spring 93 which is tensioned by a holding screw 94 threadedly mounted within the projection 92. The ball receiving passage 95 in the boss 92 is formed so that the ball may not move out of the hole 95 but may only project therefrom by an amount limited by the restriction 96 in the ball passage.

The film passing from the bottom of the film chute is directed outwardly by provision of a curved face 98 that is formed on the downwardly extending lug 13 of the body 10. As shown particularly in Fig. 7, the guiding faces 37 on the lower part of the body portion 11 merge into a curved face 98 on the lug which provides a smooth surface that directs the film end forwardly and away from the projector legs or other parts of the machine which might cause it to become entangled.

The light source for the projector is unusually small and compact, having a heat radiator of small size which keeps the apparatus cool. This light source preferably embodies a unit comprising a lamp, and a contiguous radiator in which the lamp is enclosed. The incandescent lamp 100, as shown, is mounted within the contiguous metal radiator 101 for the effective dissipation of the heat generated by the lamp. The lamp 100 is provided with a bayonet type base having locking lugs 103. The lamp base is carried by a cylindrical socket 104 having cutaway portions 105 for engagement with the lamp base lugs 103. A connecting prong 106 is fastened at 107 to the socket sleeve 104 and provides one side of the connection to a current supply plug 109. The end of the sleeve 104 carries an insulating bushing 110 having an axial opening in which a pin 111 is slidably mounted. This pin 111 provides the other prong for engagement with the connecting plug 109 and serves also as a connection through to the base terminal 112 of the lamp. As shown, the pin 111 is provided with an enlarged end 114 and a spring 115 is provided between the enlarged end and the insulating bushing 110. This spring urges the pin 111 upwardly into contacting engagement with the lamp terminal 112 and is limited in its upward movement by provision of a washer 116 which is retained on the pin 111 by a locking ring 117. The lamp socket is slidably mounted within a lamp supporting member 120 which is formed of some suitable insulating material, and is shown as having a threaded portion 121 for engagement with the lamp radiator. The lamp socket is held to the lamp supporting member 120 by provision of a set screw 121'. The position of threaded engagement of the lamp supporting member 120 with the lamp radiator is fixed by contacting engagement of the flat face 123 of the supporting member with the bottom edge of the lamp radiator. By the provision of these contacting faces the lamp supporting member always screws into the lamp radiator into contacting engagement at the same place.

The arrangement of parts that has just been described provides a focusing adjustment for the lamp. Lamps for projector service are constructed so that the greatest amount of light can be directed toward the film for effective projection. As shown, the lamp illustrated has its filament arranged in one plane. It is customary practice in constructing these lamps to mount the filament in definite fixed relationship with respect to the lugs 103 of the lamp base so that if a lamp is once positioned to give the most effective light beam the lamps may then be interchanged without losing the lamp adjustment. In this projector a lamp is readily adjusted to proper operating position by the provision of an adjustable socket that is mounted within a lamp supporting member which engages the lamp radiator in predetermined positioning. Adjustment is effected by loosening the set screw 121' and grasping the connector body 109 to move the lamp with respect to its supporting means until the proper location is found by test to give the greatest illumination in the direction of projection. Upon then tightening the set screw 121' the lamp can be removed with its supporting means and can be reinserted or lamps may be changed without altering the positioning of the lamp socket with respect to the lamp radiator.

The lamp radiator comprises a socketed portion 125 which is proportioned to rather closely fit around and receive the lamp. The lamp radiator is threaded at its lower open end to receive the lamp supporting means. The socket portion 125 of the lamp radiator is provided with aligned light passages; the passage 126 providing an opening toward the projector condensing lens, while the passage 127 opens to a reflector 128 which is mounted upon an extension wall 129 of the radiator socket. As shown, the reflector 128 is a concave member that is held in position by provision of a cup-shaped backing or supporting member 130 having a flange portion 131 for attachment by the insertion of screws 132 into the radiator part 129. The reflector 128 is resiliently held against lateral movement by provision of a cork gasket 134 mounted between the flange 131 and radiator part 129, and as held under tension against axial displacement by engagement with a flat face 135 on the supporting part 130 which provides a yielding contact with the reflector that resiliently holds it in place.

The socket wall 125 of the radiator, which is contiguous to the glass wall of the lamp is adapted to rapidly and effectively absorb the heat generated within the lamp. This heat is constantly being dissipated by the radiator through the provision of exterior fins of large surface area as compared with the area of the wall 125. As shown, the radiator is provided with a plurality of parallel vertical fins 138, and a fin 139 which extends across the top of the radiator in the direction of the light path. A transverse fin 140 is shown on the fin 139 to provide additional heat dissipating area.

The finned radiator and lamp supporting means 120 provide a unitary light source which is readily removable from the projector while assembled. Means are provided so that this unitary light source will be accurately held in proper operating alignment when attached to the projector. The supporting means for the light source 15 is in the form of a cylindrical sheet metal shell 16 which is attached to the body portion 11 by bolts 144 (see Fig. 3). The shell 16 is provided with an opening 145 which receives and encloses the projection 24 on the body portion 11 and is adapted to lie against the part 43 of the body portion; a cork gasket being positioned between these parts to effectively prevent the escape of any light therefrom. The shell 16 serves as an open ended chimney-like enclosure for the light source 15 and acts as a guard to prevent the operator from coming in contact with the lamp radiator. The transfer of heat from the radiator to the shell 16 is effectively prevented through the provision of a heat insulating lining 146 in the form of a layer of sheet cork that is attached to the shell inner wall.

The light source is positioned within the shell 16 through the provision of interengaging means; shown as cooperating lugs and notches. As shown, the oppositely positioned fins 138 are formed at their upper edges to provide outwardly extending lugs 148, and the shell 16 has formed at its upper edge spaced notches 149 which are coordinated with the positioning of the lugs so as to receive the lugs 148 when the light source is inserted within the shell 16. Co-ordination of positioning of the lugs and notches aligns the light source so that the maximum illumination is directed toward the light apertures of the projector. The radiator is retained within the shell through the provision of a latch 150 having a latching portion 151 that engages a face 152 on the radiator fin 139. The positioning of the latch 150 on the shell 16 is such that when the radiator is pushed down for interengagement of the lugs and notches the latch end 151 will engage the part 152 on the radiator.

The provision of a close fitting radiator for the lamp provides for effective dissipation of the lamp heat in that the radiant heat from the lamp is absorbed by the closely adjacent metallic wall and is effectively conducted within the radiator to the large fin area provided thereon from which the heat is rapidly dissipated. The surface temperature of the exposed radiator fins never becomes excessive as the heat is constantly being taken away by the air flowing up through the shell 16. The shell itself is insulated from the radiator by the insulating lining 146 so that the shell 16 remains cool at all times and effectively prevents the operator from contacting with the hot parts of the projector.

The supporting legs of the projector are pivotally attached to the extending lug 13 by a clamping bolt so that they may be held in extended position as shown in Fig. 1 or may be moved to a collapsed position as shown in Fig. 3. The supporting legs comprise like U-shaped members formed of sheet metal and provided with suitable feet 155. The upstanding legs 156 of the U-shaped members are provided with aligned openings for engagement by a bolt 158 which carries a thumb nut 157 for clamping the legs in desired position. The end of each leg member 156 is provided with an inturned finger 159 which overlies the adjacent leg end and limits the degree to which they can be spread. When moving the legs to the supporting position they are spread apart an amount limited by engagement of the lugs 159 with the adjacent leg ends and the nut 157 is then tightened. As the connection of the legs to the projector is a pivotal one the legs may be clamped to provide any desired degree of inclination for the projector. When the legs are moved to the collapsed position they lie closely adjacent the projector part 19 and substantially within the lateral confines of the shell 16. The film carrier 20 also lies closely adjacent the body portion 12 and it is also positioned substantially within the outline of shell 16 so that the projector when in carrying position is a compact unit.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a projector, a light source comprising a lamp, an enclosing contiguous metal radiator for said lamp, said radiator having a light passage therein and external fins thereon extending from end to end of the radiator, and an open ended shell surrounding said radiator and cooperating with the fins to provide a plurality of flues for heat dissipation.

2. In a projector, a light source comprising a lamp, an enclosing contiguous metal radiator for said lamp, end to end thereof, a cylindrical sheet metal shell surrounding said radiator, said radiator having a plurality of external fins extending from and cooperating with the fins to provide a plurality of flues for heat dissipation, and a heat insulating lining on said shell.

3. In a projector, a light source comprising a lamp, a contiguous metal radiator for said lamp, said radiator having a light passage therein, a cylindrical sheet metal shell surrounding said radiator, a light passage in said shell, and means for removably positioning the radiator within the shell with the light passages aligned, said positioning means comprising an interfitting means on the radiator and shell, and a latch removably retaining said means in engagement.

4. In a projector, an integral assembled light source removably attachable to a projector as a unit and comprising a lamp, a contiguous metal radiator for said lamp, said radiator having aligned light passages therein, a reflector, means for attaching said reflector to said radiator at one of said light passages, lamp supporting means removably attached to said radiator, a lamp socket, and means for fastening said lamp socket to said lamp supporting means in adjusted position to provide a predetermined positioning of the lamp with respect to the radiator light passages.

5. In a projector, a body portion having a flat face with a groove extending thereacross and a light aperture within the confines of said groove, a lens supporting portion having a flat face with a groove extending thereacross and a light aperture within the confines of said groove, means attaching the faces of said portions in abutting relationship with the grooves and light apertures aligned, the grooves forming a film chute within the abutting faces of said portions.

6. In a projector, a body portion having a flat surface with a groove extending thereacross and a light aperture within the confines of said groove, a projecting lug on said body portion extending from the flat surface and including a continuation of the groove, supporting legs attached to said projecting lug, a lens carrying portion having a flat surface with a groove extending thereacross and a light aperture within the confines of said groove, means joining said portions with the flat surfaces in abutting relationship and with the grooves and light apertures aligned, the grooves of the abutting surfaces forming a film chute between the abutting faces of said joined portions, the groove of the projecting lug forming a film guide in continuation of one wall of the film chute.

7. A projector comprising a body portion having a flat face with a groove extending thereacross and a light aperture within the confines of said groove, a lens carrying portion having a flat face with a groove extending thereacross and a light aperture within the confines of said groove, means joining the faces of said portions with the grooves and light apertures aligned, said grooves forming a film chute in the abutting faces of the joined portions, a recess formed in the film groove of each abutting face, and an aperture glass loosely arranged in each of said recesses, the recesses being of a depth for free passage of a film through the chute between the glasses.

8. In a projector, a projector body, a film carrier mounted on said body, said projector body having aligned light apertures spaced apart in the direction of the light beam, a slot extending through the projector body and forming a film chute, a second slot extending through said projector body transversely of the light beam and perpendicularly with respect to the film chute, a pair of aperture glasses loosely mounted in said last named slot with a glass on each side of the film chute, the second slot being of a depth for free passage of a film through the chute between the glasses, and means for retaining the glasses within said slot.

9. In a projector, a projector body, a film chute in said body defining a guided path of travel for a film, a rotatable film advancing sprocket, a bracket supporting said sprocket, means pivotally attaching said bracket to said body portion, and means for retaining said bracket in a position wherein the sprocket stands within the chute and across the path of travel of the film and in a position wherein the sprocket is removed from the path of travel of the film.

10. In a projector, a projector body, a film chute in said projector body, a film advancing sprocket, an operating shaft for said sprocket, means for rotatably mounting said sprocket shaft comprising a U-shaped bracket, means pivotally attaching said bracket to said projector body for swinging movement thereon, means for movably retaining said bracket in a position for engagement of the sprocket with a film in the chute and in a position wherein the sprocket is removed from engagement with a film, said retaining means comprising a spring pressed detent, and means for limiting the movement of the sprocket bracket in the direction away from film engaging position.

11. In a projector, a projector body, said projector body having a film chute formed therein, film advancing means comprising a sprocket, a shaft fixed to said sprocket, an operating handle fixed to said shaft, supporting means for said shaft pivotally attached to said body portion for movement thereon, and a detent mounted on the shaft supporting means and engaging the sprocket handle and the body portion for frictionally retaining the sprocket handle and supporting means in predetermined positions, said detent comprising a single coil spring and a detent member at each end thereof engaging said operating handle and said body portion.

RALPH L. LEE.

CERTIFICATE OF CORRECTION.

Patent No. 2,033,038.  March 3, 1936.

RALPH L. LEE.

It is hereby certified that error appears in the printed specification of the above numbered patent requiring correction as follows: Page 4, second column, lines 14 and 15, claim 2, strike out the words "end to end thereof, a cylindrical sheet metal shell surrounding said radiator" and insert the same after "from" in line 17; and in line 15, same claim, strike out the comma before "said"; and that the said Letters Patent should be read with this correction therein that the same may conform to the record of the case in the Patent Office.

Signed and sealed this 21st day of April, A. D. 1936.

Leslie Frazer
Acting Commissioner of Patents.

(Seal)